(12) United States Patent
Akiyama et al.

(10) Patent No.: US 7,745,063 B2
(45) Date of Patent: Jun. 29, 2010

(54) FUEL CELL STACK

(75) Inventors: Takashi Akiyama, Suita (JP); Kohji Yuasa, Hirakata (JP); Hideyuki Ueda, Ibaraki (JP); Shinsuke Fukuda, Moriguchi (JP)

(73) Assignee: Panasonic Corporation, Osaka (JP)

( * ) Notice: Subject to any disclaimer, the term of this patent is extended or adjusted under 35 U.S.C. 154(b) by 971 days.

(21) Appl. No.: 11/099,627

(22) Filed: Apr. 6, 2005

(65) Prior Publication Data

US 2005/0238943 A1    Oct. 27, 2005

(30) Foreign Application Priority Data

Apr. 27, 2004   (JP) ............................. 2004-131001

(51) Int. Cl.
*H01M 8/04*  (2006.01)
*H01M 8/02*  (2006.01)
*H01M 8/00*  (2006.01)

(52) U.S. Cl. ....................... 429/514; 429/512; 429/513; 429/456; 429/457

(58) Field of Classification Search ....................... None
See application file for complete search history.

(56) References Cited

U.S. PATENT DOCUMENTS 4,276,355 A *  6/1981  Kothmann et al. ............ 429/26
6,416,899 B1 *  7/2002  Wariishi et al. ............... 429/38
2002/0119359 A1 *  8/2002  Yamazaki et al. ............. 429/32
2003/0180590 A1 *  9/2003  Hase et al. ..................... 429/26

FOREIGN PATENT DOCUMENTS

JP    63-119166 A    5/1988
JP    05-190186      7/1993
JP    08-138696      5/1996

OTHER PUBLICATIONS

Chinese Office Action issued in corresponding Chinese patent application No. CN 2005100670220, dated Nov. 17, 2006.

* cited by examiner

*Primary Examiner*—Dah-Wei D Yuan
*Assistant Examiner*—Steven Scully
(74) *Attorney, Agent, or Firm*—McDermott Will & Emery LLP

(57) ABSTRACT

To prevent the flooding phenomenon at the cathode in a unit cell where the temperature is relatively low or the supply of air is small, a fuel cell stack includes at least three flat unit cells stacked with separators interposed therebetween, the unit cells comprising an anode, a cathode and an electrolyte membrane sandwiched therebetween, and having an oxidant channel formed on the surface of the separator adjacent to the cathode, and the anode and the cathode comprising a catalyst layer attached to the electrolyte membrane and a diffusion layer, wherein the cross-sectional area of the inlet side of the oxidant channel, the area of the cathode catalyst layer, the thickness of the electrolyte membrane or the amount of a water repellent contained in the combination of the cathode and the oxidant channel is the largest in at least one of the unit cells at the ends of the stack.

1 Claim, 3 Drawing Sheets

FUEL CELL STACK

BACKGROUND OF THE INVENTION

Fuel cells can be classified according to the type of electrolyte used: phosphoric acid fuel cell, alkaline fuel cell, molten carbonate fuel cell, solid oxide fuel cell, solid polymer electrolyte fuel cell, etc. Among them, the solid polymer electrolyte fuel cell, which is capable of low temperature operation and has high output density, has been commercialized as the power sources for automobiles and the home cogeneration systems.

Meanwhile, with the increasing sophistication of portable devices including laptop computers, cell phones and personal digital assistants (PDAs), power consumption has been increasing significantly in recent years. Since the energy density of lithium ion secondary batteries and nickel-metal hydride secondary batteries has failed to keep up with the increasing demand for the power consumption, there is a growing concern that the capacity of the power sources will be insufficient sometime soon.

Under the circumstances, attention has been given to the solid polymer electrolyte fuel cell (hereinafter referred to as "PEFC") as the power source to solve the problem. Particularly, the direct oxidation fuel cell is considered most promising because the direct oxidation fuel cell can generate electric energy at room temperature by performing, on the electrode, the direct oxidation of a fuel without reforming the fuel to hydrogen and thus it does not require a reformer, and it can be made smaller.

As the fuel for the direct oxidation fuel cell, low molecular weight alcohols or ethers are investigated. Among them, methanol is considered most promising because the fuel cell utilizing methanol offers high energy efficiency and high output. The fuel cell utilizing methanol as the fuel is called "direct methanol fuel cell" (hereinafter referred to as "DMFC").

The reactions on the anode and the cathode of the DMFC can be expressed by the following reaction formulas (1) and (2). The oxygen to be fed to the cathode as the oxidant is usually obtained from the air.

$$CH_3OH+H_2O \rightarrow CO_2+6H^++6e^- \quad (1)$$

$$3/2O_2+6H^++6e^- \rightarrow 3H_2O \quad (2)$$

Similar to the PEFC that utilizes hydrogen as the fuel, the DMFC currently utilizes, as the electrolyte membrane, a perfluorocarbon sulfonic acid membrane as typified by Nafion (registered trade name).

Ideally, methanol as the fuel reacts on the anode according to the formula (1), but methanol might pass through the electrolyte membrane to the cathode, which is called "crossover phenomenon".

The crossover phenomenon reduces the power generation performance of the fuel cell. The methanol reaching the cathode is oxidized on the cathode according to the following formula (3). As a result, the potential of the cathode decreases to reduce the power generation voltage of the fuel cell.

$$CH_3OH+3/2O_2 \rightarrow CO_2+2H_2O \quad (3)$$

The crossover phenomenon is believed to result from the combined use of a water-soluble fuel and an electrolyte membrane exhibiting proton conductivity when water is incorporated in the membrane, and it is a common problem for the direct oxidation fuel cells under development.

As for the theoretical electromotive force, the PEFC that utilizes hydrogen as the fuel has a theoretical electromotive force of 1.23 V, and the DMFC has a theoretical electromotive force of 1.21 V. In practice, however, because the reaction overvoltage of the formula (2) is so significant, the PEFC generates a voltage of 0.6 to 0.8 V. The DMFC generates a voltage of only 0.3 to 0.5 V because, in addition to the crossover phenomenon, the reaction overvoltage of the formula (1) is also significant.

For this reason, when fuel cells are used to operate electronic devices, it is necessary to connect a plurality of unit cells in series to form a stack, or to incorporate a charge pump circuit, to yield the desired voltage. Usually, the both methods mentioned above are combined for use.

In the case where a plurality of unit cells are connected, although it depends on the shape of the device utilizing the fuel cell as the power source and also on the presence or absence of auxiliary equipment such as a pump for transporting a fuel and a pump for transporting air, the arrangement of unit cells is determined mainly from a space-saving point of view. Usually, a stack comprising a plurality of flat unit cells is used. To be more specific, a single unit cell comprises an anode, a cathode, and an electrolyte membrane sandwiched between the anode and the cathode. A plurality of unit cells are stacked with bipolar plates or separators interposed therebetween such that a fuel channel is adjacent to the anode and an oxidant channel is adjacent to the cathode. The channels for fuel or oxidant are formed on the surfaces of the bipolar plates or separators.

Ideally, the fuel and air are fed uniformly into all the unit cells in the fuel cell stack described above. In practice, however, there is a variation in the supply of the fuel and air, causing each unit cell to exhibit different power generation performance, eventually reducing the power generation performance of the whole stack. In view of this, there is proposed to improve the structure of a manifold for supplying a fuel gas so as to feed the fuel gas uniformly to the unit cells (see Japanese Laid-Open Patent Publication No. Hei 05-190186).

Various techniques to prevent the variation of the fuel gas supply other than the above have been investigated from various aspects. Regarding the improvement of the flooding phenomenon at the cathode, however, improvement has been made only in the internal structure of a unit cell, and there is no focus on the improvement of the whole stack.

In the PEFC which is operated at a temperature of not higher than 100° C., i.e. the boiling point of water, the so-called flooding phenomenon is likely to occur. The flooding phenomenon is a phenomenon that impairs the gas diffusibility in the electrode because the water generated at the cathode due to the reaction of the formula (2) is supersaturated to aggregate. In order to overcome this problem, Japanese Laid-Open Patent Publication No. Hei 08-138696 proposes to change the shape of an oxidant gas channel within a unit cell to prevent the aggregation of water.

The incidence of the cathode flooding phenomenon varies depending on the unit cells. For example, when temperature differences occur among the unit cells in the stack, water is more likely to aggregate in the unit cells with a low temperature, increasing the incidence of the flooding phenomenon therein. In the case of a stack comprising a plurality of flat unit cells, the unit cell positioned at the top and that positioned at the bottom are likely to dissipate heat outside the stack. Accordingly, those cells have a relatively low temperature.

In the DMFC, because the incidence of the crossover phenomenon increases as the concentration of methanol is increased at the interface between the anode and the electrolyte membrane, an aqueous solution of methanol with a low concentration of 1 to 2 mol/L is often used. In the crossover phenomenon, however, water also passes through the electrolyte membrane with methanol. As such, a large amount of water is transported from the anode to the cathode. In some cases, the amount of water transported is about 100 times that of water generated at the cathode by power generation. Accordingly, the flooding phenomenon is an extremely serious problem in the DMFC.

BRIEF SUMMARY OF THE INVENTION

In a fuel cell stack, the heat generated within the unit cells by power generation is removed by either expelling the heat outside the unit cells through materials such as fuel and air, allowing the heat to conduct through the separators and dissipate from the surface of the stack, or expelling the heat with a cooling medium circulating within the stack. For this reason, the unit cells that are placed at the ends of the stack and free to exchange heat with the outside air, lead wires, case, etc dissipates more heat, and therefore they are likely to have a relatively low temperature. Particularly when a cooling medium is not circulated inside the stack, this tendency increases.

When an oxidant is fed to the whole stack through a duct with the use of an oxidant-supplying device, the wall surface of the duct exists near the unit cells positioned at the ends of the stack. As such, in the unit cells positioned at the ends, the amount of oxidant flow is likely to be small.

As described above, in the unit cells positioned at the ends of the stack, the amount of air flow is likely to be scarce, and the temperature is likely to be low. Additionally, in many cases, in at least one of the unit cells positioned at the ends of the stack, the amount of air flow or the temperature is likely to be the lowest.

In view of the above, the present invention proposes the following fuel cell stacks (i) to (iv).

(i) A fuel cell stack comprising at least three flat unit cells stacked with separators interposed therebetween, the unit cell each comprising an anode, a cathode and an electrolyte membrane sandwiched between the anode and the cathode, and having an oxidant channel formed on the surface of the separtor adjacent to the cathode, and the anode and the cathode each comprising a catalyst layer attached to the electrolyte membrane and a diffusion layer, wherein the cross-sectional area of the inlet side of the oxidant channel is the largest in at least one of the unit cells positioned at the ends of the stack.

In this embodiment, the cross-sectional area of the inlet side of the oxidant channel is increased in the unit cells that dissipate a relatively large amount of heat and have a low temperature. This increases the intrusion of the oxidant from the manifold to the oxidant channel to increase the supply of the oxidant. Moreover, increasing the cross-sectional area of the inlet side of the oxidant channel can prevent water from aggregating even in the unit cells having a low temperature, decreasing the variation in incidence of the flooding phenomenon among the unit cells. Accordingly, it is possible to prevent the decrease of the voltage in some unit cells or the reverse of the polarity of the unit cells due to the flooding phenomenon, and thus to prevent the decrease of the output of the whole stack.

The feature of this embodiment is to define the cross-sectional area of the inlet side of the oxidant channel. As such, between the inlet side and the outlet side, a plurality of routes may be merged or not merged. The cross-sectional area of each route may be changed or not changed. A route may be branched or not branched. The oxidant channel may have the structure in which the oxidant enters from one route, travels through the diffusion layer in the unit cell and exits from other routes (i.e. interdigitated channel).

The term "inlet side of the oxidant channel" herein means the entrance for introducing the oxidant into the oxidant channel of one single unit cell. The entrance may be divided into a plurality of routes. When the entrance is divided into a plurality of routes, the cross-sectional area of the inlet side of the oxidant channel means the total of the cross-sectional areas of the plurality of routes. Note that in the case where the separator adjacent to the cathode has a manifold aperture for introducing the oxidant, the inlet side of the oxidant channel and the manifold aperture should be distinguished.

The oxidant channel is usually one or a plurality of grooves formed on the surface of the separator to be adjacent to the cathode. When the grooves constituting the channel are not merged or branched, or when the cross-sectional area of every groove is not changed from the inlet side to the outlet side of the oxidant channel, the cross-sectional area of the inlet side of the oxidant channel ($S_0$) corresponds to the product of the cross-sectional area of one groove ($S_1$) and the number of the grooves ($N_1$), i.e. $S_0 = S_1 \times N_1$. When the grooves constituting the channel are merged or branched, or when the cross-sectional area of any groove is changed from the inlet side to the outlet side, the cross-sectional area of the inlet side of the oxidant channel ($S_0$) corresponds to the product of the cross-sectional area of one groove at the entrance of the oxidant ($S_2$) and the number of the grooves (routes) at the entrance of the oxidant ($N_2$), i.e. $S_0 = S_2 \times N_2$. In other words, the cross-sectional area of the inlet side of the oxidant channel can be adjusted by changing the depth of the grooves or the number of the grooves.

The cross-sectional area of the inlet side of the oxidant channel should be larger in at least one unit cell positioned at the ends of the stack than in other unit cells, it should be gradually reduced on average from the end to the center. Preferably, the cross-sectional area of the inlet side of the oxidant channel is the largest in the unit cells positioned at both ends, and the smallest in the unit cell positioned at the center or the unit cells around the center.

The present invention is effective particularly in a fuel cell stack where the pressure loss when the oxidant passes through the channel is low, the discharge pressure of the oxidant-supplying device is small and the difference of pressure between the inlet side and the outlet side of the channel is small. This is because, in a fuel cell stack where the discharge pressure of the oxidant-supplying device is large and the difference of pressure between the inlet side and the outlet side of the channel is large, the amount of oxidant flow increases significantly in the unit cells where the cross-sectional area of the inlet side of the channel is large, and the variation in the amount of oxidant flow might occur among the unit cells. Accordingly, although it depends of the size of the fuel cell stack, the pressure loss of the oxidant channel is preferably not greater than 10 kPa in the fuel cell stack of the present invention. Further, the fuel cell stack of the present invention preferably uses, but not limited to, a fan as the air-supplying device.

(ii) A fuel cell stack comprising at least three flat unit cells stacked with separators interposed therebetween, the unit cell each comprising an anode, a cathode and an electrolyte membrane sandwiched between the anode and the cathode, and having an oxidant channel formed on the surface of the separator adjacent to the cathode, and the anode and the cathode each comprising a catalyst layer attached to the electrolyte membrane and a diffusion layer, wherein the area of the catalyst layer in the cathode is the largest in at least one of the unit cells positioned at the ends of the stack.

In this embodiment, the area of the cathode catalyst layer is increased in the unit cells where the flooding phenomenon is likely to occur due to the small amount of oxidant flow or low temperature whereas the area of the cathode catalyst layer is decreased in the unit cells where the flooding phenomenon is unlikely to occur. Thereby, among the plurality of unit cells connected in series, the current density will be low in the unit cells having an increased area of the catalyst layer, and the current density will be high in the unit cells having a decreased area of the catalyst layer. As a result, the variation of the flooding phenomenon is prevented to prevent the variation of the current that flows in each unit cell.

As can be seen from the reaction formula (2), the amount of water produced at the cathode is proportional to the current generated. Accordingly, in the unit cell having an increased area of the cathode, the amount of water produced at the cathode per unit area is small. For this reason, even when the supply of the oxidant is relatively small or the temperature is relatively low, water is unlikely to aggregate, making it unlikely to cause the flooding phenomenon. Therefore, it is possible to prevent the decrease of voltage in some unit cells or the reverse of the polarity of the unit cells due to the flooding phenomenon, and thus to prevent the decrease of the output of the whole stack.

The area of the cathode catalyst layer should be larger in at least one unit cell positioned at the ends of the stack than in other unit cells, or it should be gradually decreased on average from the end to the center. Preferably, the area of the cathode catalyst layer is the largest in the unit cells positioned at both ends, and the smallest in the unit cell positioned at the center or the unit cells around the center.

(iii) A fuel cell stack comprising at least three flat unit cells stacked with separators interposed therebetween, the unit cell each comprising an anode, a cathode and an electrolyte membrane sandwiched between the anode and the cathode, and having an oxidant channel formed on the surface of the separator adjacent to the cathode, and the anode and the cathode each comprising a catalyst layer attached to the electrolyte membrane and a diffusion layer, wherein the thickness of the electrolyte membrane is the greatest in at least one of the unit cells positioned at the ends of the stack.

In this embodiment, when a stack for a direct oxidation fuel cell such as DMFC is constructed by stacking at least three flat unit cells, the thickness of the electrolyte membrane is increased in the unit cells where the amount of the fuel that crosses over tends to be relatively large whereas the thickness of the electrolyte membrane is reduced in the unit cells where the amount of the fuel that crosses over tends to be relatively small. In the unit cells having an increased thickness of the electrolyte membrane, the amount of water transported to the cathode due to the crossover will be reduced. For this reason, even when the supply of the oxidant is relatively small or the temperature is relatively low, the flooding phenomenon is unlikely to occur. Accordingly, it is possible to prevent the decrease of voltage in some unit cells or the reverse of the polarity of the unit cells due to the flooding phenomenon, and thus to prevent the decrease of the output of the whole stack.

The thickness of the electrolyte membrane should be greater in at least one unit cell positioned at the ends than in other unit cells, or it should be gradually reduced on average from the end to the center. Preferably, the thickness of the electrolyte membrane is the greatest in the unit cells positioned at both ends, and the smallest in the unit cell positioned at the center or the unit cells around the center.

(iv) A fuel cell stack comprising at least three flat unit cells stacked with separators interposed therebetween, the unit cell each comprising an anode, a cathode and an electrolyte membrane sandwiched between the anode and the cathode, and having an oxidant channel formed on the surface of the separator adjacent to the cathode, and the anode and the cathode each comprising a catalyst layer attached to the electrolyte membrane and a diffusion layer, wherein the combination of the cathode and the oxidant channel contains a water repellent, and the amount of the water repellent is the greatest in at least one of the unit cells positioned at the ends of the stack.

In this embodiment, the amount of the water repellent contained in the combination of the cathode and the oxidant channel is increased in the unit cells where the flooding phenomenon is likely to occur due to the small amount of oxidant flow or low temperature whereas the amount of the water repellent contained in the combination of the cathode and the oxidant channel is reduced in the unit cells where the flooding phenomenon is unlikely to occur.

Examples of the water repellent contained in the combination of the cathode and the oxidant channel include: a water repellent that is contained optionally in the catalyst layer (e.g. a layer comprising a mixture of a catalyst and an electrolyte); a water repellent optionally contained in the diffusion layer (e.g. carbon paper or carbon cloth); a water repellent optionally contained in a coating layer formed on the diffusion layer or the catalyst layer by applying or spraying; and a water repellent optionally attached to the grooves formed on the separator that constitute the oxidant channel.

When the amount of the water repellent contained in the cathode is increased, the effect of preventing water from staying on the surface or micropores of the catalyst layer or the diffusion layer will be increased. When the amount of the water repellent contained in the oxidant channel is increased, the effect of preventing water from accumulating in the oxidant channel will be increased. Accordingly, the inhibition of the gas diffusion due to the retention or accumulation of water will be prevented, the discharge of water vapor will be accelerated, and the flooding phenomenon can be prevented. In other words, even if the supply of the oxidant is relatively small or the temperature is relatively low, the flooding phenomenon will be unlikely to occur. Accordingly, it is possible to prevent the decrease of voltage in some unit cells or the reverse of the polarity of the unit cells due to the flooding phenomenon, and thus to prevent the decrease of the output of the whole stack.

The amount of the water repellent contained in the combination of the cathode and the oxidant channels should be increased in at least one unit cell positioned at the ends than in other unit cells, or it should be gradually reduced on average from the end to the center. Preferably, the amount of the water repellent contained in the combination of the cathode and the oxidant channel is the greatest in the unit cells at both ends, and the smallest in the unit cell positioned at the center or the unit cells around the center.

As described above, according to the present invention, even when there is a variation in temperature or supply of the oxidant among the unit cells, the flooding phenomenon at the cathode or the clogging of the oxidant channel can be prevented in the unit cells where the supply of the oxidant is relatively small or the temperature is relatively low. Thereby, the variation of power generation performance among the unit cells can be prevented, and a fuel cell stack capable of generating electricity in a stable manner with a high output can be provided.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Embodiment 1

Figure 1:
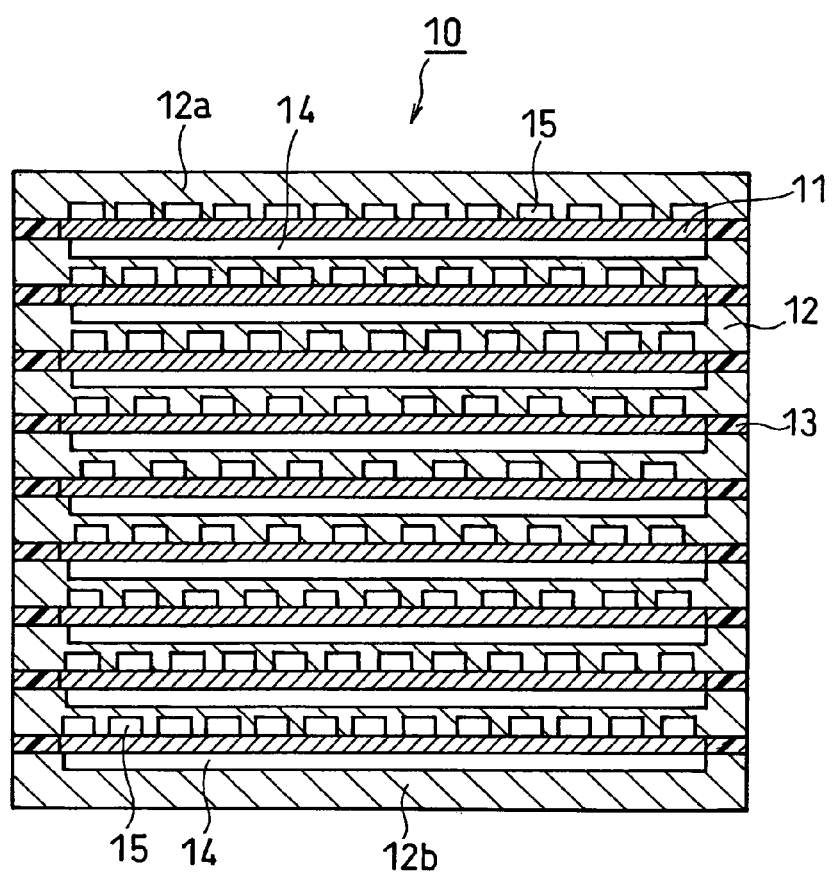
FIG. 1 is a schematic vertical cross-sectional view of a fuel cell stack according to a first embodiment of the present invention.
Figure 2:
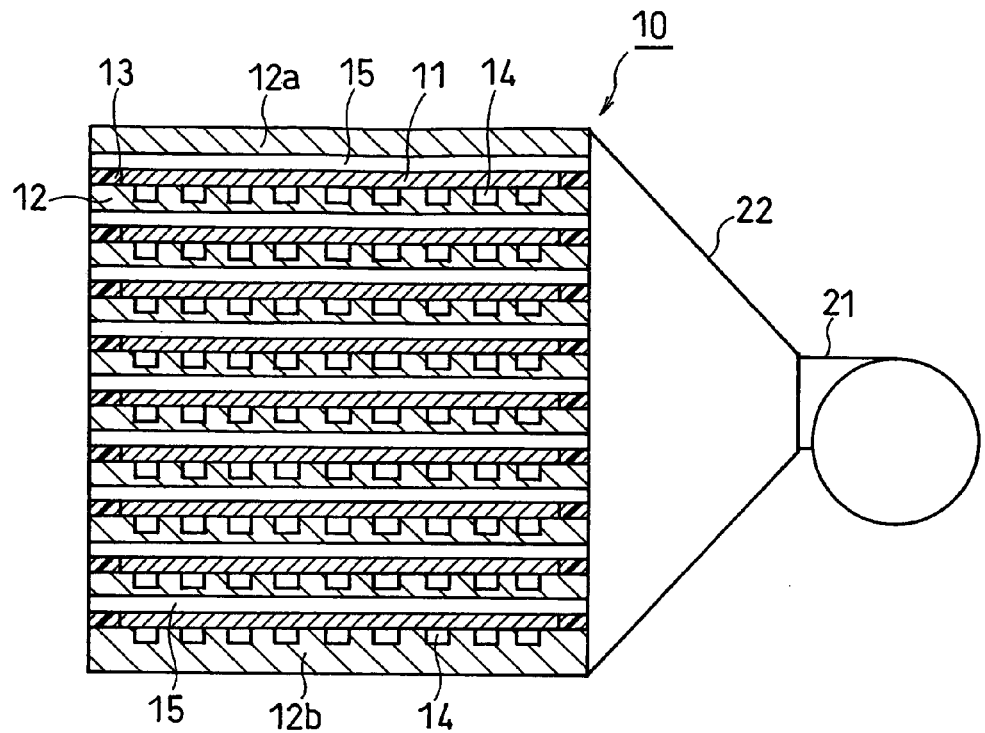
FIG. 2 is a schematic cross-sectional diagram illustrating an arrangement of a fuel cell stack, an air-supplying device and an air-introducing duct.

FIG. 1 is a schematic cross-sectional view of a fuel cell stack 10 according to this embodiment taken perpendicular to the flowing direction of air. FIG. 2 is a schematic cross-sectional diagram illustrating an arrangement of the fuel cell stack 10, an air-supplying device 21 and an air-introducing duct 22. The cross section of the fuel cell stack 10 in FIG. 2 is in parallel with the flowing direction of air. In this diagram, a single air-supplying device 21 and the inlet of a single fuel cell stack 10 are connected with an air-introducing duct 22. Although the cross section of the air-introducing duct 22 is increased toward the fuel cell stack 10 in FIG. 2, the shape of the duct is not limited thereto.

The fuel cell stack 10 is a stack comprising membrane electrode assemblies (MEAs) 11 and separators placed on both surfaces of each MEA 11. Insulating gaskets 13 are arranged on the peripheries of the MEAs 11. The gaskets 13 serve to prevent adjacent unit cells from short-circuiting and to prevent the fuel and air from leaking out. The fuel cell stack 10 has nine unit cells stacked. Each single unit cell has the MEA 11 and a fuel channel 14 and an oxidant channel 15 arranged on both sides of the MEA.

Figure 3:
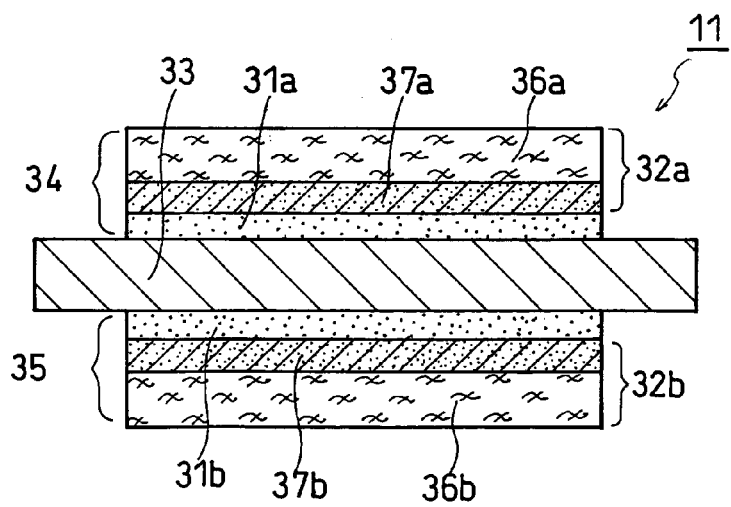
FIG. 3 is a schematic cross-sectional view of a membrane electrode assembly (MEA).

As shown in FIG. 3, the MEA 11 comprises an anode 34, a cathode 35 and an electrolyte membrane 33 sandwiched by the anode 34 and the cathode 35. The anode 34 comprises a catalyst layer 31a and a diffusion layer 32a. Likewise, the cathode 35 comprises a catalyst layer 31b and a diffusion layer 32b. As the electrolyte membrane 33, preferably used is a solid polymer electrolyte, for example, a perfluorocarbon sulfonic acid membrane such as Nafion (registered trade name). An organic-inorganic hybrid electrolyte can also be used. Examples of the organic-inorganic hybrid electrolyte include, but not limited to, composites including an organic material and silica or tungsten oxide. The diffusion layer 32a of the anode 34 comprises a substrate 36a and a coating layer 37a formed on the catalyst-layer-side surface of the substrate 36a. Likewise, the diffusion layer 32b of the cathode 35 comprises a substrate 36b and a coating layer 37b formed on the catalyst-layer-side surface of the substrate 36b. The compositions of the catalyst layers 31a and 31b may be the same or different. Further, the structures of the diffusion layers 32a and 32b may be the same or different.

On one end of the fuel cell stack 10 is placed a separator 12a having only oxidant channel 15 formed on one surface of the separator 12a. The oxidant channel 15 is adjacent to the cathode 35 of the MEA 11. Likewise, on the other end of the fuel cell stack 10 is placed a separator 12b having only fuel channel 14 formed on one surface of the separator 12b. The fuel channel 15 is adjacent to the anode 34 of the MEA 11. The separators 12 other than the separators 12a and 12b (i.e. the separators each between two MEAs 11) have a fuel channel 14 formed on one surface thereof and an oxidant channel 15 formed on the other surface thereof. The fuel channel 14 is adjacent to the anode 34 of the MEA 11, and the oxidant channel 15 is adjacent to the cathode 35 of the MEA 11.

In FIG. 2, the air-supplying device 21 is smaller in size than the fuel cell stack 10. The cross section of the air-introducing duct 22 is increased toward the fuel cell stack 10. As such, when the air-supplying device 21 is placed at the center of the height of the fuel cell stack 10, the closer to the wall of the air-introducing duct 22 unit cells are, the more friction the air portion to the unit cells obtains from the wall although it may vary depending on the air velocity and the flowing condition of the air. For this reason, the amount of air flow sent from the air-supplying device 21 is often the smallest in the unit cells placed at the ends of the fuel cell stack 10, and the largest in the unit cell placed at the center of the fuel cell stack 10 (i.e. the fifth cell from the ends).

From the viewpoint of energy saving, noise reduction and miniaturization, a non-positive displacement pump such as centrifugal fan or axial fan is preferably used as the air-supplying device 21. A non-positive displacement pump can deliver a large amount of flow, but it has a small discharge pressure, which increases the variation in the amount of air flow among the unit cells. If the air-supplying device 21 is a positive displacement pump, which has a relatively high discharge pressure, the pressure difference between the inlet side and the outlet side of the oxidant channels will be likely to be the same, that is, the driving force for sending air to the oxidant channels will be likely to be the same. Thus, the use of a positive displacement pump can prevent the variation in the amount of air flow among unit cells. From the viewpoint of energy-saving, noise reduction and miniaturization, however, the use of a positive displacement pump is difficult.

In the fuel cell stack 10, the heat generated in the unit cells by power generation is likely to be conducted through the separators 12a and 12b positioned at the ends and then dissipated. Accordingly, the closer to the end of the stack 10 the unit cell positions, the more heat the unit cell is likely to dissipate, resulting in a relatively low temperature.

In view of this, in the fuel cell stack 10, the cross-sectional area of the inlet side of the oxidant channel is increased in the unit cells positioned at the ends which are likely to obtain a relatively small amount of air and have a low temperature, and the cross-sectional area of the same is decreased in the unit cell positioned at the center which is likely to obtain a relatively large amount of air and have a high temperature. The larger the cross-sectional area of the inlet side of the oxidant channel, the easier the flow of the air in the channel, allowing water vapor to diffuse easily. As a result, the percentage of water that exists in the form of vapor in the produced water increases, making it less likely for the water in the form of liquid to accumulate in the unit cells. This can prevent the decrease of voltage in some unit cells or the reverse of the polarity of the unit cells due to the flooding phenomenon, eventually preventing the decrease of the output of the whole stack. Further, the larger the cross-sectional area of the inlet side of the oxidant channel, the lower the pressure loss due to the friction between the air and the wall of the channel. Accordingly, the pump for supplying the air to the channels can be made smaller, making it easy to save power.

The method for changing the cross section of the inlet side of the oxidant channel in each cell is not specifically limited.

For example, any of the height, the width or the spacing (i.e. the number) of the grooves can be changed within an appropriate range. In the fuel cell stack 10, the oxidant channel 15 has a plurality of parallel straight grooves formed on the surface of the separator. The grooves are formed from one end face of the separator to the other end face of the same. As for the number of the grooves, the unit cells positioned at the ends have the greatest number of grooves (13 grooves), and the unit cell positioned at the center has the smallest number of grooves (9 grooves). The cross-sectional area of each groove is equal, and it is unchanged throughout (i.e. from the inlet to the outlet).

In FIG. 1, the unit cells positioned at the ends have the largest cross-sectional area of the inlet side of the oxidant channel 15, and the closer to the center other unit cells are, the smaller the cross-sectional area of the inlet side of the oxidant channel 15. However, the cross-sectional areas need not necessarily to be changed gradually cell by cell. Other possible method is to divide the stack into blocks, each block comprising a plurality of unit cells, and to change the cross sectional area to decrease block by block toward the center. Alternatively, only the cross-sectional area of the inlet side of the oxidant channel of the unit cells positioned at the ends may be increased to be larger than those of the other unit cells.

The shape or pattern of the oxidant channel is not specifically limited as long as the air can be supplied uniformly to the cathode surface. A preferred example is a serpentine channel comprising one continuous sinuous groove. A parallel channel comprising a plurality of parallel straight grooves is also preferred because it is easy to manufacture and it has an advantage that the pressure loss can be reduced significantly compared to the serpentine channel. In the case of employing the serpentine channel, the discharge pressure of the pump must be increased in order to reduce the pressure loss, which means a larger pump, which may make a louder noise, is required. Accordingly, in the case where the fuel cell stack is small, the parallel channel is preferred to use.

The method for supplying the fuel to the anode is not specifically limited. In FIGS. 1 and 2, the fuel channel is formed on the surface of the separator, but the method is not limited thereto. By way of example, a non-woven fabric is placed between the anode and the separator. With the use of capillary action, the fuel can be supplied to the anode through the non-woven fabric. Another example is a spray method in which the fuel is sprayed uniformly onto the anode.

The separator is usually made of carbon plate which is resistant to corrosion and has high electron conductivity, but the separator is not limited thereto. The oxidant channel can be formed by, for example, carving the surface of the separator made of carbon plate or the like to make grooves. However, the method for forming the channel is not limited thereto, and any method may be used to form the channel. For example, a separator having the channel formed thereon may be created using various molding or casting methods, or the channel may be formed by affixing ribs on the surface of a flat plate.

The catalyst layers 31a and 31b are preferably made of a mixture including a noble metal catalyst such as platinum and a polymer electrolyte such as Nafion (registered trade name). The noble metal catalyst is pulverized or attached to carbon particles or oxide particles in order to increase the surface area thereof. The catalyst layers can be formed by, for example, fixing, on the surface of an electrolyte membrane, a paste mixture including carbon particles carrying a noble metal catalyst thereon and a polymer electrolyte. As the catalyst for the cathode, platinum is preferably used. As for the catalyst for the anode, in order to reduce the poisoning of the active site by the carbon monoxide contained in the fuel or the carbon monoxide generated during the oxidation process of methanol, a platinum-ruthenium alloy is preferably used. In order to prevent the flooding phenomenon, the catalyst layer for the cathode preferably further contains a water repellent. The water repellent is preferably a fluorocarbon resin such as polytetrafluoroethylene (PTFE).

The substrates 36a and 36b for constituting the diffusion layers for the anode and the cathode are preferably carbon paper or carbon cloth. Preferably, these substrates are porous, and they are treated for water repellency such that the water repellent is contained in the matrix thereof. The water repellent treatment is performed by immersing the substrate in a liquid dispersion containing, for example, a surfactant and a water repellent such as PTFE or a tetrafluoroethylene-hexafluoropropylene copolymer (FEP), which is then dried and baked. The coating layers 37a and 37b can be formed by, for example, coating the catalyst-layer-side surface of the substrate treated for water repellency, with a mixture containing carbon particles and a water repellent such as PTFE by spraying method or doctor-blade method.

Embodiment 2

The fuel cell stack according to this embodiment has a structure identical to that of Embodiment 1 except that, instead of the cross-sectional area of the inlet side of the oxidant channel, the area of the cathode catalyst layer is the largest in the unit cells positioned at the ends of the stack.

Figure 4:
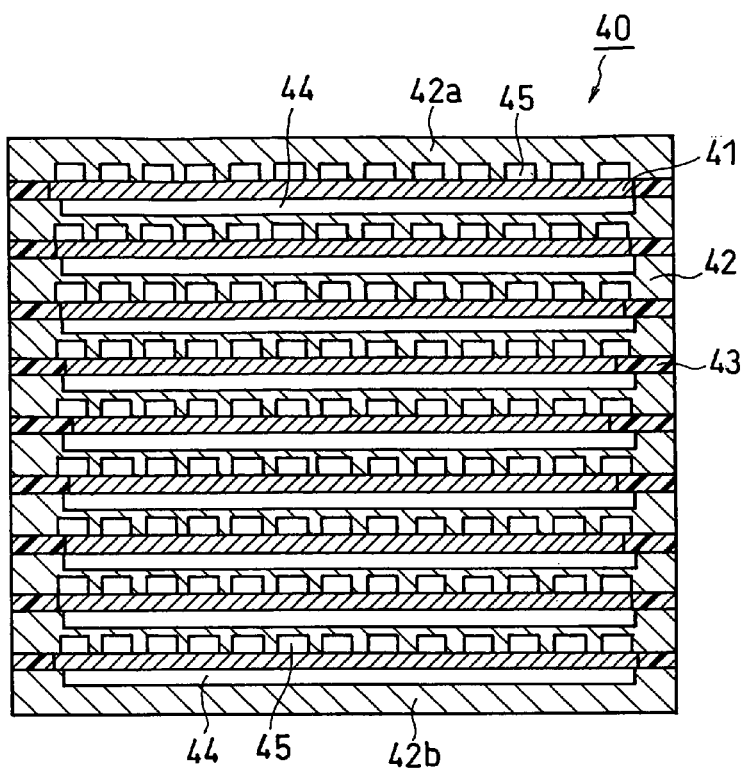
FIG. 4 is a schematic vertical cross-sectional view of a fuel cell stack according to a second embodiment of the present invention.

FIG. 4 is a schematic vertical cross-sectional view of a fuel cell stack 40 according to this embodiment taken perpendicular to the flowing direction of air. The fuel cell stack 40 is a stack comprising membrane electrode assemblies (MEAs) 41 and separators placed on both surfaces of each MEA 41. Insulating gaskets 43 are arranged on the peripheries of the MEAs 41. The fuel cell stack 40 has nine unit cells stacked. Each single unit cell has the MEA 41 and a fuel channel 44 and an oxidant channel 45 arranged on both sides of the MEA 41. The structure of the MEA 41 is the same as that of Embodiment 1.

On one end of the fuel cell stack 40 is placed a separator 42a having only an oxidant channel 45 formed on one surface of the separator 42a. The oxidant channel 45 is adjacent to the cathode of the MEA 41. Likewise, on the other end of the fuel cell stack 40 is placed a separator 42b having only a fuel channel 44 formed on one surface of the separator 42b. The fuel channel 44 is adjacent to the anode of the MEA 41. The separators 42 other than the separators 42a and 42b (i.e. the separators each between two MEAs 41) have a fuel channel 44 formed on one surface thereof and an oxidant channel 45 formed on the other surface thereof. The fuel channel 44 is adjacent to the anode of the MEA 41, and the oxidant channel 45 is adjacent to the cathode of the MEA 41.

The unit cells positioned at the ends of the stack 40 have the largest size of the MEA 41. The unit cell positioned at the center of the fuel cell stack 40 (i.e. the fifth cell from the ends) has the smallest size of the MEA 41. The size of the MEA 41 is proportional to the area of the cathode catalyst layer. Accordingly, even in the unit cells positioned at the ends where the supply of air is likely to be small and the temperature is likely to be low, the current density will be lower than that in the unit cell positioned at the center, preventing the flooding phenomenon. As a result, the variation of the current flowing among the unit cells will be reduced.

In the case where only the area of the cathode catalyst layer of each cell is changed while the area of the electrolyte membrane is maintained constant, when the area of the anode catalyst layer is smaller than that of the cathode catalyst layer, the reactivity of the cathode catalyst layer portion not facing the anode catalyst layer will be lower than the other portions. A similar tendency is observed when the area of the anode catalyst layer is larger than that of the cathode catalyst layer. Therefore, the area of the anode catalyst layer is preferably changed according to the area of the cathode catalyst layer. However, the present invention is not limited thereto.

When the area of the cathode catalyst layer is changed, the width of the catalyst layer can be changed in the direction parallel to the direction of the main flow of oxidant, in the direction perpendicular to the same or in both directions parallel and perpendicular to the same. However, in order to facilitate the supply of the air to the cathode and the removal of the product water particularly in the unit cell where the catalyst layer has a small area, it is preferred to increase the contact area between the air flowing in the oxidant channels and the cathode as large as possible. For this reason, the width of the catalyst layer is preferably increased as large as possible in the direction parallel to the direction of the main flow of oxidant.

In FIG. 4, the area of the MEA 41 is the largest in the unit cells positioned at the ends, and the closer to the center other unit cells are, the smaller the area of the MEA 41. However, the area of the MEA 41 need not necessarily to be changed gradually cell by cell. Other possible method is to divide the stack into blocks, each block comprising a plurality of unit cells, and to decrease the area of cathode catalyst layer block by block toward the center. Alternatively, only the area of the cathode catalyst layer of the unit cells positioned at the ends may be increased to be larger than those of other unit cells.

Embodiment 3

The fuel cell stack according to this embodiment has a structure identical to that of Embodiment 1 except that, instead of the cross-sectional area of the inlet side of the oxidant channel, the thickness of the electrolyte membrane is the greatest in the unit cells positioned at the ends of the stack.

When the fuel cell stack comprising at least three unit cells stacked with separators interposed therebetween is used to construct a DMFC, it is important to take into account the transport of methanol and water due to the crossover phenomenon in the designing process.

First, the transport of methanol due to the crossover phenomenon is explained.

The transport of methanol is considered to be caused mainly by two factors: (1) molecular diffusion of methanol and (2) electrochemical transport of protons. The former is a diffusion phenomenon based on the difference of the methanol concentration on the interface between the electrolyte membrane and the anode and that between the electrolyte membrane and the cathode. The latter is an electrophoresis or electro-osmosis that occurs due to the transport of protons in the electrolyte membrane during power generation.

The molecular diffusion phenomenon depends largely on the concentration of the aqueous solution of methanol supplied to the anode. When the current density is increased, usually, the concentration of methanol at the interface between the anode and the electrolyte membrane decreases. That is, the molecular diffusion phenomenon has a negative correlation with the current density. It also depends on the diffusion velocity of methanol in the electrode or the like. The electrochemical transport phenomenon has, on the other hand, a positive correlation with the current density because when the current density is increased, the amount of protons that migrate increases. When the current density is excessively increased, however, the methanol concentration at the interface between the anode and the electrolyte membrane will be decreased as noted above. As such, a current density over a certain level can turn the positive correlation into a negative correlation. It is generally recognized that the molecular diffusion has more effect on the crossover phenomenon.

Since the amount of methanol transported by the crossover depends largely on the concentration gradient as described above, it is a well-known fact that the amount is in inverse proportion to the thickness of the electrolyte membrane. This is because as the thickness of the membrane is increased, the distance between the anode and the cathode also increases to decrease the steepness of the concentration gradient.

The transport of water due to the crossover phenomenon is then explained.

When the aqueous solution of methanol has a high concentration, the amount of water present in the anode will be small whereas the amount of water produced at the cathode by power generation or the oxidation of the methanol passing through the membrane will be increased. It is also a well-known fact that when the amount of water produced at the cathode is increased significantly, the balance of water concentration is reversed, allowing the water to diffuse backwards from the cathode to the anode. However, it is presumed that the amount of water transported normally depends largely on the electrochemical transport, and not the molecular diffusion of water.

The electrochemical transport of water is influenced by an electric field. In addition, the magnitude of the electric field varies according to the thickness of the electrolyte membrane (i.e. the distance between the electrodes). In other words, changing the thickness of the electrolyte membrane changes the amount of water transported. There is a negative correlation between the thickness of the electrolyte membrane and the amount of water transported.

The foregoing illustrates that the transport of methanol and water by the crossover phenomenon can be controlled to a certain extent by changing the thickness of the electrolyte membrane. However, if the thickness of the electrolyte membrane is increased in all the unit cells, a disadvantage will occur. Specifically, a thick electrolyte membrane increases the resistance to proton conductivity, which increases the ohmic overvoltage during power generation to decrease the power generation characteristics. In order to avoid such disadvantage, in the present invention, the thickness of the electrolyte membrane is changed cell by cell. More specifically, the unit cells positioned at the ends of the stack where the flooding phenomenon is likely to occur and the prevention of the crossover is important have an increased thickness of the electrolyte membrane than that of other unit cells. Thereby, in the unit cells positioned at the ends of the stack where the supply of the oxidant tends to be relatively small and the temperature tends to be relatively low, the amount of methanol and water transported by the crossover phenomenon is reduced to effectively prevent the degradation of the performance of the whole fuel cell stack.

It is preferred that the thickness of the electrolyte membrane be the greatest in the unit cells positioned at both ends of the fuel cell stack, that the thickness of the electrolyte membrane be gradually reduced toward the center, and that the thickness of the electrolyte membrane be the smallest in the unit cell positioned at the center or near the center. The thickness of the electrolyte membrane need not necessarily to be changed cell by cell. Other possible method is to divide the stack into blocks, each block comprising a plurality of unit cells, and to decrease the thickness of the electrolyte membrane block by block toward the center. Alternatively, only the thickness of the electrolyte membrane of the unit cells positioned at the ends may be increased to be larger than that of other unit cells.

Embodiment 4

The fuel cell stack according to this embodiment has a structure identical to that of Embodiment 1 except that the amount of a water repellent contained in the combination of the cathode and the oxidant channel is the greatest in the unit cells positioned at the ends of the stack, instead of allowing the unit cells positioned at the ends of the stack to have the largest cross-sectional area of the inlet side of the oxidant channel.

Flooding phenomenon is caused by the water produced at the cathode and the water transported to the cathode from the anode by the crossover, in which water droplets accumulate in the cathode catalyst layer and the diffusion layer or the oxidant channel adjacent to the cathode to inhibit the diffusion of the air or to reduce the effective catalyst active site. In order to prevent the flooding phenomenon, it is effective to incorporate a water repellent into the catalyst layer and the diffusion layer of the cathode so as to facilitate the removal of water in the cathode.

However, when the material that is often used as the water repellent such as PTFE or FEP is used in a large amount, the electrode reaction, the transport of protons or electrons, and the gas diffusion is inhibited. In order to avoid such disadvantage, in the present invention, the amount of the water repellent contained in the combination of the cathode and the oxidant channel is changed cell by cell. In other words, the amount of the water repellent contained in all the unit cells is not made to be uniform, but the amount of the water repellent is adjusted in each unit cell considering the balance of the whole stack.

More specifically, the amount of the water repellent contained in the combination of the cathode and the oxidant channel is increased in the unit cells positioned at the ends of the stack where the flooding phenomenon is likely to occur and the prevention of the crossover is important, compared to that of other unit cells. Thereby, in the unit cells positioned at the ends where the supply of the oxidant tends to be relatively small and the temperature tends to be relatively low, the flooding phenomenon can be prevented, and the degradation of the performance of the whole fuel cell stack can be effectively prevented.

It is preferred that the amount of the water repellent contained in the combination of the cathode and the oxidant channel be the greatest in the unit cells positioned at the ends of the fuel cell stack, that the amount be gradually decreased toward the center, and that the amount be the smallest in the unit cell positioned at the center or near the center. The amount of the water repellent contained in the combination of the cathode and the oxidant channel need not necessarily to be changed cell by cell. Other possible method is to divide the stack into blocks, each block comprising a plurality of unit cells, and to decrease the amount of the water repellent block by block toward the center. Alternatively, only the amount of the water repellent in the unit cells positioned at the ends may be increased to be larger than that of other unit cells.

The water repellent may be added only to the cathode, only to the oxidant channel or to both the cathode and the oxidant channel. When the water repellent is added to the cathode, it may be added only to the catalyst layer, only to the diffusion layer or to both the catalyst layer and the diffusion layer. Further, the water repellent may be contained in the coating layer optionally formed on the diffusion layer or the catalyst layer by way of application or spraying.

When the water repellent is contained in the catalyst layer, a paste is prepared by, for example, mixing PTFE powders with a mixture of carbon particles having noble metal catalyst carried thereon and a polymer electrolyte. With the use of the obtained paste, the anodes or cathodes for unit cells are produced. During the production thereof, the amount of PTFE powders to be contained in the paste is changed among the unit cells. When the water repellent is contained in the diffusion layer, carbon paper or carbon cloth serving as the substrate is immersed in a liquid dispersion of PTFE or FEP, followed by drying and baking. During this process, the amount of PTFE or FEP to be contained in the dispersion is changed among the unit cells. When the water repellent is contained in the coating layer, a paste prepared by, for example, mixing a dispersion of the water repellent and carbon particles is applied onto the substrate, followed by drying and baking. During this process, the amount of the water repellent to be contained in the paste is changed among the unit cells.

The present invention will be described below in more detail referring to examples, but it should be understood that the scope of the present invention is not limited thereto.

EXAMPLE 1

As an example of the fuel cell stack according to the embodiment 1 of the present invention, a fuel cell stack for DMFC using methanol as a fuel and having a structure identical to that of FIG. 1 was produced.

(i) Production of Membrane Electrode Assembly (MEA)

The catalyst particles for the cathode were prepared by allowing 100 parts by weight of conductive carbon particles having an average primary particle size of 30 nm to carry 50 parts by weight of platinum as the catalyst. Likewise, the catalyst particles for the anode were prepared by allowing 100 parts by weight of the same conductive carbon particles as above to carry 50 parts by weight of a platinum-ruthenium alloy in an atomic ratio of Pt:Ru=1:1. The obtained catalyst particles were each dispersed, with the use of an ultrasonic disperser, in a diluent prepared by diluting an ethanol solution containing a polymer electrolyte with water, followed by defoaming to give a catalyst paste for the anode and a catalyst paste for the cathode. The polymer electrolyte used here was Flemion (registered trade name) available from Asahi Glass Co, Ltd. The content of Flemion in each paste was 30 wt % relative to the solid content.

Each catalyst paste was applied onto a polypropylene sheet having a thickness of 50 µm by a bar-coater, which was then allowed to stand at room temperature for 1 day for drying. The obtained polypropylene sheet carrying the anode catalyst and the obtained polypropylene sheet carrying the cathode catalyst were placed on both surfaces of a polymer electrolyte membrane. Each catalyst was heat transferred onto the polymer electrolyte membrane by a hot press, after which the polypropylene sheets were removed. The polymer electrolyte membrane used here was Nafion 117 (registered trade name) available from Du Pont Kabushiki Kaisha. The membrane had a square shape with sides of 12 cm. The area of each catalyst layer formed on the membrane was 25 $cm^2$. Each catalyst layer had a square shape with sides of 5 cm.

Carbon paper (TGP-H-090) available from Toray Industries, Inc. was prepared as the substrate for the diffusion layer. The substrate was immersed in a diluent of FEP dispersion (ND-1) available from Daikin Industries, Ltd. at an appropriate concentration for 1 minute. Thereafter, the substrate was dried at 100° C. in a hot-air dryer, and then baked at 270° C. in an electric oven for 2 hours. The content of the water repellent (FEP) contained in the substrate was 5 wt % relative to the total.

Acetylene black powders were introduced into PTFE dispersion (D-1) available from Daikin Industries, Ltd, which were then dispersed by an ultrasonic disperser. The obtained dispersion was mixed in a mixer (available from Dalton Corporation) while defoaming under a reduced pressure to yield a paste for the coating layer. The content of the water repellent contained in the paste was 20 wt % relative to the solid content. The obtained paste was applied, by a bar-coater, onto one surface of the carbon paper substrate having treated for water repellency, which was then dried at room temperature, followed by baking at 270° C. in an electric oven for 2 hours. The content of the water repellent (FEP and PTFE) was 3 wt % relative to the total weight of the substrate and the coating layer. The substrate having the coating layer formed thereon was cut out to give diffusion layers having the same size as the catalyst layer. The polymer electrolyte membrane having the anode catalyst layer on one surface thereof and the cathode catalyst layer on the other surface thereof was sandwiched by two diffusion layers such that the coating layers of the diffusion layers respectively faced the anode catalyst layer and the cathode catalyst layer to give a membrane electrode assembly (MEA).

(ii) Production of Separator

Ten separators were produced by forming grooves that would serve as the oxidant channel or fuel channel on the surface of a graphite plate having a thickness of 2 mm by means of cutting.

The oxidant channel was a parallel type comprising a plurality of parallel straight grooves. The grooves constituting the oxidant channel were formed from one end face to the other end face of each graphite plate. Manifold apertures were not formed in the graphite plates. The air was fed directly to each oxidant channel from the air-introducing duct adjacent to one side of the fuel cell stack, and discharged from the other side of the stack. The cross section of the grooves constituting the oxidant channel had a rectangle shape with a height of 0.7 mm and a width of 1 mm. All separators had the grooves having the same cross-section. However, note that the cross-sectional area of the inlet side of the oxidant channel was changed by changing the spacing between parallel grooves in each cell.

The fuel channel was a serpentine type. Inlet and outlet manifold apertures communicating with the fuel channel were formed in the graphite plates. The cross section of the grooves constituting the fuel channel had a square shape with a width of 1 mm and a height of 1 mm. All the separators had the same fuel channels.

The separators to be positioned at the ends of the fuel cell stack had only either the oxidant channel or the fuel channel formed on one surface thereof. Other eight separators had the oxidant channel on one surface thereof and the fuel channel on the other surface thereof.

In the separator having only the oxidant channel formed thereon to be positioned at one end of the fuel cell stack and the separator to be positioned at the other end of the fuel cell stack, the spacing between oxidant grooves was 1.6 mm. The spacing between oxidant grooves in other separators was gradually increased by 0.2 mm as the separators were positioned closer to the center. Accordingly, in the separator to be positioned at the center of the fuel cell stack, the spacing between oxidant grooves was 2.4 mm.

As many grooves as possible were formed in the area with a width of 48 mm of the separator (i.e. the area except the edge portions each having a width of 1 mm). As a result, the first and ninth unit cells positioned at the ends had 30 grooves, the second and eighth unit cells had 26 grooves, the third and seventh unit cells had 24 grooves, the fourth and sixth unit cells had 21 grooves, and the fifth unit cell at the center had 20 grooves. As for the cross-sectional area of the inlet side of the oxidant channel, the unit cells positioned at the ends had a cross-sectional area of 21 mm$^2$, the second and eighth unit cells had a cross-sectional area of 18.2 mm$^2$, the third and seventh unit cells had a cross-sectional area of 16.8 mm$^2$, the fourth and sixth unit cells had a cross-sectional area of 14.7 mm$^2$, and the unit cell at the center had a cross-sectional area of 14 mm$^2$.

(iii) Assembly of Fuel Cell Stack

A stack comprising nine unit cells was assembled by stacking the MEAs and the separators alternately such that the unit cells at the ends (i.e. the first and ninth unit cells) had the largest cross-sectional area of the inlet side of the oxidant channel, and that the unit cell at the center (i.e. the fifth unit cell from the end) had the smallest cross-sectional area of the inlet side of the oxidant channel. In advance, gasket sheets of silicone rubber were arranged on the peripheries of the MEAs to prevent the fuel and air from leaking out, which was then sandwiched by the separators. Current collector plates each comprising a copper plate plated with gold were placed on both outer surfaces of the separators positioned at the ends of the stack. On the outer surfaces of the current collector plates were placed insulating plates, and further compression plates made of stainless steel. In other words, the stack was sandwiched by the current collector plates, the insulating plates and the compression plates. The whole stack was then pressed in the stacking direction using 8 sets of bolt, nut and spring to yield a fuel cell stack. This fuel cell stack was referred to as "stack A".

Comparative Example 1

A fuel cell stack was produced in the same manner as in EXAMPLE 1, except that all the separators had an oxidant channel having 24 grooves with a spacing of 2.0 mm. The cross-sectional area of the inlet side of the oxidant channel was 16.8 mm$^2$ in all the unit cells. The fuel cell stack produced here was referred to as "stack R".

EXAMPLE 2

As an example of the fuel cell stack according to the embodiment 2 of the present invention, a fuel cell stack for DMFC using methanol as a fuel and having a structure identical to that of FIG. 4 was produced.

A fuel cell stack B was produced in the same manner as in COMPARATIVE EXAMPLE 1 except that, the size of the catalyst layer to be transferred to the polymer electrolyte membrane was changed. Specifically, the width of the catalyst layer perpendicular to the direction of the oxidant channel was changed while the width of the catalyst layer parallel to the direction of the oxidant channel was fixed at 50 mm. All the separators had oxidant channels identical to those in COMPARATIVE EXAMPLE 1.

In the first and ninth unit cells from one end of the fuel cell stack, the catalyst layer had a width perpendicular to the direction of the oxidant channel of 5.6 cm. The width in other separators was gradually decreased by 3 mm as the separators were positioned closer to the center. In the unit cell positioned at the center, the catalyst layer had a width perpendicular to the direction of the oxidant channel of 4.4 cm. Accordingly, as for the area of the catalyst layer, the unit cells positioned at the ends had an area of 28 cm$^2$, the second and eighth unit cells had an area of 26.5 cm$^2$, the third and seventh unit cells had an area of 25 cm$^2$, the fourth and sixth unit cells had an area of 23.5 cm$^2$, and the fifth unit cell at the center had an area of 22 cm$^2$. The current density in the unit cells positioned at the ends was 79% of that of the unit cell at the center. In all the MEAs, the anode catalyst layer had the same shape and size as the cathode catalyst layer.

In all the unit cells, the cross-sectional area of the inlet side of the oxidant channel formed on the separator was 16.8 mm$^2$, similar to COMPARATIVE EXAMPLE 1.

EXAMPLE 3

As an example of the fuel cell stack according to the embodiment 3 of the present invention, a fuel cell stack for DMFC using methanol as a fuel was produced.

A fuel cell stack C was produced in the same manner as in COMPARATIVE EXAMPLE 1 except that, the thickness of the polymer electrolyte membrane used in the MEA was changed.

However, if the difference in membrane thickness among the unit cells is too large, the variation in power generation performance will be facilitated. Accordingly, in order to reduce the difference in membrane thickness among the unit cells, a plurality of electrolyte membranes were used singly or in combination. Commercially available Nafion membranes have three types: Nafion 112, Nafion 115 and Nafion 117. They have a thickness of 50 μm, 125 μm and 175 μm, respectively.

In the step of combining two electrolyte membranes, water was applied so as not to create a space between the electrolyte membranes. Then, two electrolyte membranes were attached by hot pressing. The hot pressing was performed in the same manner as the MEA was produced. Although, immediately after the hot pressing, the total thickness was smaller than that of the original membranes in some cases, it was confirmed that the total thickness became the same as that of the original membranes after water was applied.

In the first and ninth unit cells from one end of the fuel cell stack, one Nafion 117 membrane and one Nafion 112 membrane were combined. In the second and eighth unit cells, four Nafion 112 membranes were combined. In the third and seventh unit cells, one Nafion 117 membrane was used. In the fourth and sixth unit cells, three Nafion 112 membranes were combined. In the fifth unit cell positioned at the center, one Nafion 115 membrane was used. Accordingly, the thickness of the electrolyte membrane of the MEA was 225 μm, 200 μm, 175 μm, 150 μm and 125 μm from the unit cells at the ends toward the center.

In all the unit cells, the cross-sectional area of the inlet side of the oxidant channel formed on the separator was 16.8 mm$^2$, similar to COMPARATIVE EXAMPLE 1.

EXAMPLE 4

As an example of the fuel cell stack according to the embodiment 4 of the present invention, a fuel cell stack for DMFC using methanol as a fuel was produced.

A fuel cell stack D was produced in the same manner as in COMPARATIVE EXAMPLE 1 except that, the amount of the water repellent contained in the diffusion layers of the anode and the cathode was changed.

Five dispersions having different concentrations were prepared by diluting FEP dispersion (ND-1) available from Daikin Industries, Ltd with different amounts of water. Then, carbon paper (TGP-H-090) available from Toray Industries, Inc. as the substrate for the diffusion layer was immersed, for 1 minute, in the FEP dispersion diluted to have a predetermined concentration. Thereafter, the substrate was dried at 100° C. in a hot-air dryer, and then baked at 270° C. in an electric oven for 2 hours. The obtained substrates were respectively labeled as α, β, γ, δ and ε. These substrates contained the water repellent (FEP) in an amount of 11 wt %, 9 wt %, 7 wt %, 5 wt % and 3 wt %, respectively, relative to the whole.

Subsequently, five pastes for the coating layer having different compositions were prepared in the same manner as in EXAMPLE 1 except that the mixing ratio of PTFE dispersion (D-1) available from Daikin Industries, Ltd and acetylene black powders was changed.

The obtained pastes were respectively applied onto one surface of the substrates α, β, γ, δ and ε such that the substrate containing more amount of FEP carried more amount of PTFE, and that the total amount of acetylene black and PTFE was the same, followed by drying at room temperature and then baking at 270° C. in an electric oven for 2 hours. As a result, there were obtained diffusion layers α, β, γ, δ and ε having the water repellents (FEP and PTFE) in an amount of 7 wt %, 5 wt %, 3 wt %, 2 wt % and 1 wt %, respectively, relative to the total weight of the substrate and the coating layer.

In the first and ninth unit cells from one end of the fuel cell stack, the diffusion layer α was used. In the second and eighth unit cells, the diffusion layer β was used. In the third and seventh unit cells, the diffusion layer γ was used. In the fourth and sixth unit cells, the diffusion layer δ was used. In the fifth unit cell positioned at the center, the diffusion layer ε was used. In the above manner, a fuel cell stack D was produced.

In all the unit cells, the cross-sectional area of the inlet side of the oxidant channel formed on the separator was 16.8 mm$^2$, similar to COMPARATIVE EXAMPLE 1.

[Evaluation]

The fuel cell stacks produced in EXAMPLEs 1 to 4 and COMPARATIVE EXAMPLE 1 were subjected to power generation test to verify the effect of the present invention.

As the air-supplying device, a sirocco fan manufactured by Minebea Co. Ltd. was used. The outlet of the fan and the inlet side of the oxidant channels of the fuel cell stack were connected with an air-introducing duct made of polypropylene and having a rectangular cross section. Power generation was performed in a controlled atmosphere with a temperature of 25° C. and a humidity of 60%.

The flow rate of air sent to each cell was controlled such that the volume flow rate was 1 L/min in each cell.

Methanol was used as the fuel. An aqueous solution of methanol at a concentration of 1 mol/L was supplied to the anodes of the fuel cell stack at a flow rate of 18 ml/min by a liquid pump.

Figure 5:
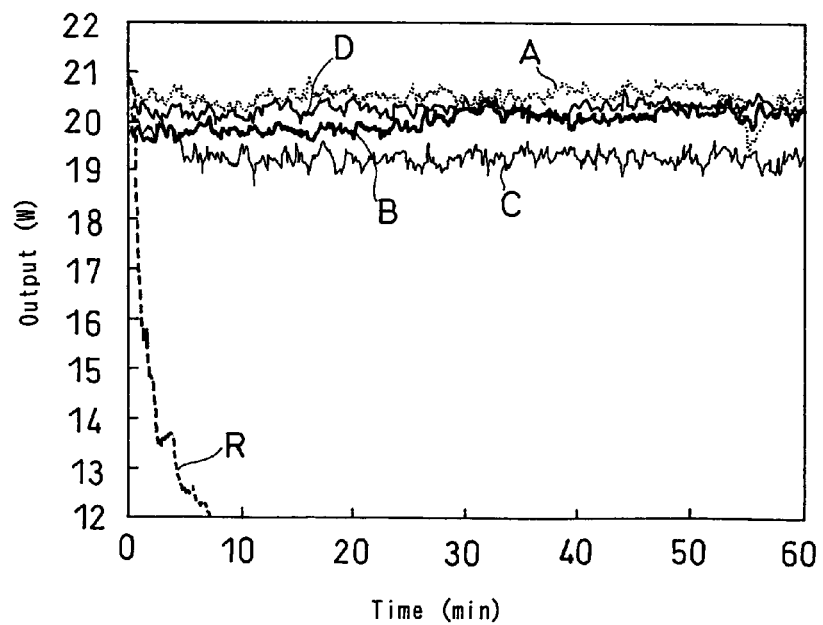
FIG. 5 is a graph showing the change of output obtained when fuel cell stacks of the present invention are subjected to a power generation.

In the power generation test, Electronic Load System 890B manufactured by Scribner Associates, Inc. was used. The system was operated for 1 hour with a controlled constant voltage of 2.7 V, during which the change of the output was measured. If the nine unit cells generated a uniform voltage, each unit cell was supposed to generate 0.3 V. The voltage and temperature of each unit cell were recorded every 1 second by a data logger. FIG. 5 shows the change of the output of the fuel cell stacks in the power generation test.

Although the fuel cell stacks did not include a heater for temperature increase therein, the fuel cell stacks self-heated even when the power generation started at room temperature, and the average temperature of all the unit cells reached 60° C. In the fuel cell stack of EXAMPLE 1, the unit cell positioned at the center had the highest temperature. The temperature decreased as unit cells were positioned toward the ends. The differences thereof varied with time, but the temperature difference was always within the range of 5 to 10° C.

As is obvious from FIG. 5, in the fuel cell stack R of COMPARATIVE EXAMPLE 1, the output started decreasing in a very short time. The voltage of each unit cell was checked, and it was found that the voltage of the unit cells positioned at the ends significantly decreased concurrently with the decrease of the output. When the power generation was interrupted, each unit cell recovered the open circuit voltage (OCV). The unit cells other than those at the ends recovered a voltage of 0.7 V, but the unit cells at the ends had a low voltage of 0.5 V.

The inside of the oxidant channels of the fuel cell stack R was observed with the use of a penlight. In the unit cells positioned closer to the ends, more water droplets were observed on the wall of the channel and the surface of the diffusion layer. Further, grooves completely clogged with water droplets were also observed. The unit cells positioned closer to the ends had more clogged grooves. With the use of an air gun, high-pressure air was admitted to all the grooves so as to remove the water droplets. The OCV of the unit cells positioned at the ends became the same level as that of the other unit cells. Subsequently, the power generation was restarted. Immediately after the restart of power generation, an output similar to the one after the start of the test was obtained. However, the output started decreasing again after the same lapse of time as in the first test, and the reproducibility was confirmed.

The foregoing clearly illustrates that the output decrease of the fuel cell stack was caused by the flooding at the cathode. Particularly, the main cause for the output decrease is the high incidence of flooding in the unit cells positioned at the ends. Presumably, the low OCV after the interruption of power generation is also caused by flooding because the flooding inhibits the diffusion of air to decrease the activity of air at the cathode.

In the fuel cell stacks of the present invention A, B, C and D, on the other hand, almost no output decrease or output variation was observed, and they all generated electricity in a stable manner for 1 hour. As for the voltage of each unit cell, the phenomenon in which the voltage decreased significantly in some unit cells was not observed. All the unit cells had an OCV of 0.7 V after the interruption of power generation. The inside of the oxidant channels was observed, and noticeable water droplets were not observed.

The fuel cell stack of the present invention is useful as a power source for small portable electronic devices such as cell phones, personal digital assistants (PDAs), laptop computers and camcorders. It is also useful as a power source for electric scooters.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A fuel cell stack comprising at least three flat unit cells stacked with separators interposed therebetween,
    said unit cell each comprising an anode, a cathode and an electrolyte membrane sandwiched between said anode and said cathode, and having an oxidant channel formed on the surface of said separator adjacent to said cathode, and
    said anode and said cathode each comprising a catalyst layer attached to said electrolyte membrane and a diffusion layer,
    wherein the total cross-sectional area of the inlet side of said oxidant channel is larger in both of the unit cells positioned at the ends of said stack relative to the rest of the stack.

* * * * *